United States Patent
Seaman et al.

(10) Patent No.: US 8,701,585 B1
(45) Date of Patent: Apr. 22, 2014

(54) BOAT HULL AND METHOD OF MAKING

(76) Inventors: Lloyd W. Seaman, Plantation, FL (US); Jeffrey C. Albury, Plaintation, FL (US)

( * ) Notice: Subject to any disclaimer, the term of this patent is extended or adjusted under 35 U.S.C. 154(b) by 185 days.

(21) Appl. No.: 13/020,059

(22) Filed: Feb. 3, 2011

(51) Int. Cl.
B63B 5/24 (2006.01)

(52) U.S. Cl.
USPC ....................................................... 114/357

(58) Field of Classification Search
USPC .............. 114/357; 264/45.1, 45.2, 45.3, 45.4, 264/45.6, 46.4, 46.5, 46.6
See application file for complete search history.

(56) References Cited

U.S. PATENT DOCUMENTS

| | | | |
|---|---|---|---|
| 4,197,233 A | 4/1980 | Marshall | |
| 4,496,535 A | 1/1985 | Gould et al. | |
| 5,118,728 A * | 6/1992 | Primeaux | 523/315 |
| 5,647,297 A | 7/1997 | Hansen | |
| 5,670,215 A | 9/1997 | Oakes | |
| 5,814,398 A | 9/1998 | Kronz et al. | |
| 6,609,475 B2 | 8/2003 | Thomas et al. | |
| 6,755,348 B1 | 6/2004 | Langeman | |
| 7,001,948 B2 * | 2/2006 | Gupta et al. | 524/871 |
| 7,125,032 B2 | 10/2006 | Hopper | |
| 7,409,920 B2 | 8/2008 | Mataya et al. | |
| 7,775,172 B2 | 8/2010 | Hansen | |
| 2010/0162938 A1 * | 7/2010 | Halfon | 114/343 |

* cited by examiner

*Primary Examiner* — Lars A Olson
*Assistant Examiner* — Anthony Wiest
(74) *Attorney, Agent, or Firm* — Malin Haley DiMaggio & Bowen, P.A.

(57) ABSTRACT

A watercraft such as a boat that is molded in two sections such as the boat deck and the boat hull using a polyurea composition and polyurethane foam and chopped glass fibers. The resulting monolithic structure can be manufactured very quickly in a closed molding process that does not create volatile organic compounds. The resulting watercraft eliminates the use of fiberglass in the construction of boats.

3 Claims, 6 Drawing Sheets

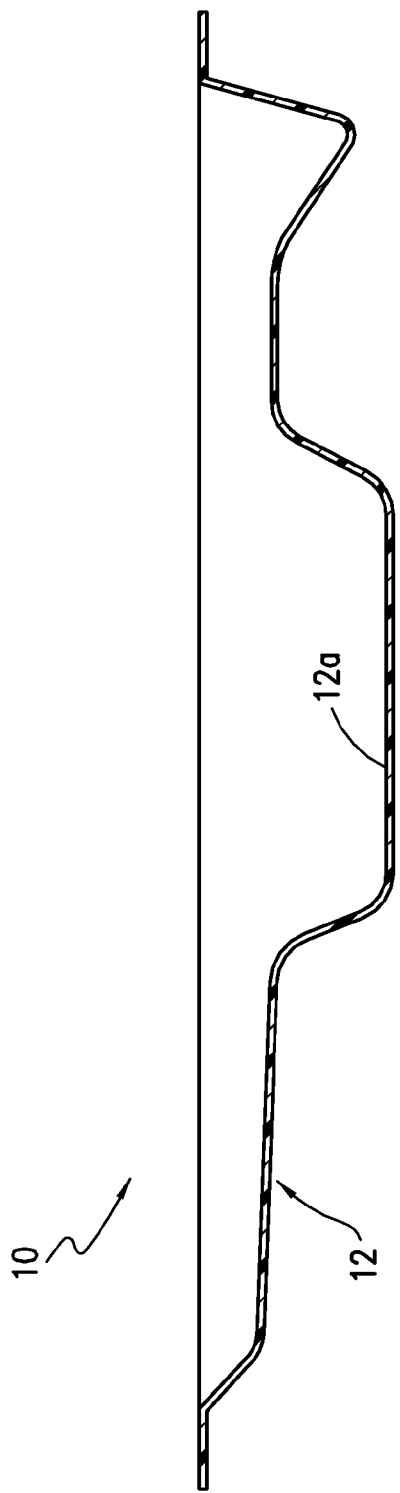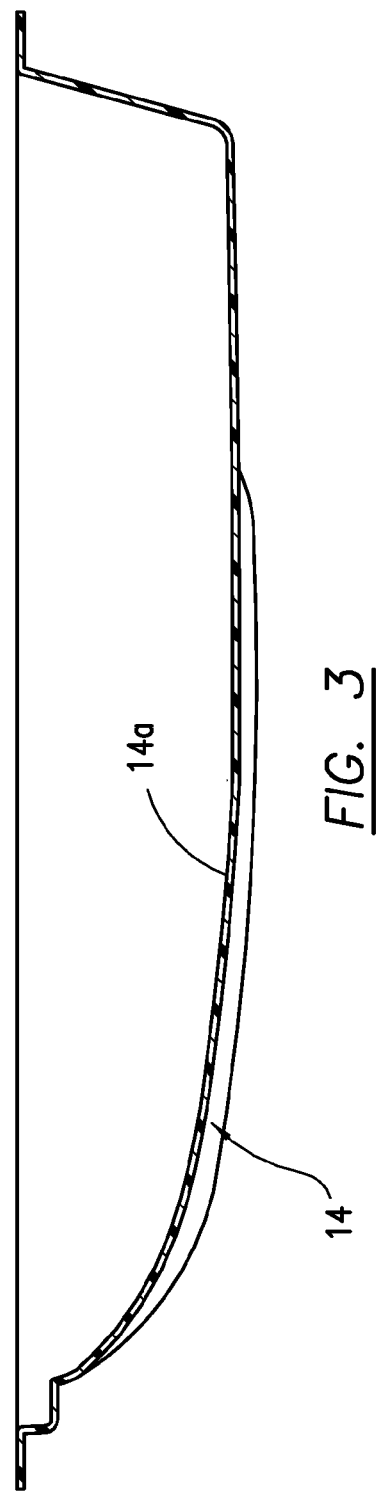

BOAT HULL AND METHOD OF MAKING

BACKGROUND OF THE INVENTION

1. Field of the Invention

This invention relates generally to a boat hull and a method of making, and specifically to an improved boat hull having improved strength and efficiency of manufacture for cost reductions.

2. Description of Related Art

In the last 20 years, a large number of small boats, typically monohulls, used as watercraft, including but not limited to rowboats, sailboats, powerboats, electric powered boats, and water toys, have been constructed of fiberglass and epoxy. Two of the drawbacks for using fiberglass in the construction of boats are that the process of molding fiberglass boats is labor-intensive and produces toxic vapors. Typically, a boat is constructed in a mold that requires hand labor that requires layers of fiberglass material and resins joined together. The process of constructing each boat hull and deck is time-consuming and labor-intensive, thereby adding to the overall cost of construction. There are environmental issues with the construction of fiberglass boats in the creation of volatile organic compounds (VOC).

The invention described herein, including the method of making a boat hull, can reduce production costs significantly and eliminate volatile organic compounds. The watercraft hulls that result using Applicants' invention are stronger than fiberglass hulls of comparable sizes and weights, are more durable with regard to the elements, and are much less costly to build.

SUMMARY OF THE INVENTION

A boat hull constructed in a closed two-piece mold, one mold half representing the boat deck, and the other mold half representing the boat hull. The operative materials used in the construction of the molded boat hull are polyurea, fiber reinforced polyurethane foam, and chopped fibers of glass, Kevlar or carbon.

The master mold includes two half molds. The first half mold is used to construct the deck of the boat. A second half mold is used to construct the boat hull. When the boat is constructed, the deck mold and the hull mold are fastened together. A foam material is injected into the closed mold to unite the deck portion with the boat hull. The process is explained in greater detail below.

The present invention overcomes the traditional fiberglass boat construction difficulties by providing a very fast molding process that results in a boat that is relatively complete with interior decks and floors in a monolithic structure with seamless component joinery. The boat hull and working deck form the major portion of the finished boat. The manufacturing process for making a boat includes pre-forming the deck portion using a deck mold by spraying the mold surface with polyurea and chopped fibers. The polyurea can be fully cured in less than five minutes. In addition, the boat hull mold is sprayed with polyurea and chopped fibers to form the boat hull. The polyurea spray gun combines diisocyanate and reactive amine, and used with a chopper provides chopped fibers to the polyurea mixture.

The next step uses equipment to spray a one to one ratio of high density fiber reinforced foam onto the deck mold polyurea first coat and onto the boat hull mold polyurea first coat. This foam layer will rise slightly to ½ inch to ¾ inch. When cured, this foam will provide a very dense and hard layer of impact protection, as well as add to the overall structural integrity of the hull.

The next step adds a rigid metal tubular frame to the boat structure. The frame is made of a bent and welded tubular structure. The frame provides a peripheral rigid tubular metal frame around the boat that is molded together with the deck and hull. The frame is lowered into the boat hull mold during molding. The tubular structure also can provide unique grab handles and a transom support system, as well as enhanced safety and security much like a roll cage in a vehicle.

After the two molds are cured, the deck mold is lowered onto the hull mold and secured with heavy duty mechanical fasteners. The remaining air void inside the mold is filled with fiber reinforced 8 pound density foam. This foam rises through vent holes at the perimeter.

After allowing the mold to cool, the boat can be removed from the mold. At this point, the seams are trimmed and the hull is prepped and taped for nonskid and final accessories. The boat is then sprayed again with polyurea to provide a textured finish to the decks and molding seam.

Aliphatic polyurea topcoat is applied to the boat in desired finished colors. This aliphatic polyurea topcoat adds ultraviolet U/V stability needed for years of fade resistance.

The entire process is VOC emission free.

The polyurea coating, including chopped fibers, is sprayed onto each mold surface using a digital proportioning plural component, high pressure and high temperature spray apparatus and a chopper. The polyurea coating composition is generated from the reaction of a diisocyanate with a component containing reactive amine groups. Accordingly, polyurea systems comprise at least two components. The first component comprises an isocyanate and the second component is a compound that contains a reactive amine group. Thus, the high-pressure spray apparatus combines both components to form a polyurea that is applied to each mold surface to an approximate average thickness of 0.250 inches. The chopped fibers can be glass, Kevlar, or carbon. The polyurea coating is fully cured in less than five minutes.

A complete molded boat can be constructed in a few hours. Applicants have determined that a boat constructed in accordance with this invention is extremely durable and is virtually unsinkable.

It is an object of this invention to manufacture watercraft including rowboats, sailboats, powerboats, electric powered boats, water toys, and similar Marine devices using a very fast molding process that results in watercraft that are relatively complete with interior decks and floors in a monolithic structure with seamless component joinery.

It is another object of this invention is to provide a sturdy durable watercraft that eliminates volatile organic compounds during the construction process that allows for the molding and manufacturing of a boat literally within a few hours.

DESCRIPTION OF THE DRAWINGS

FIG. 2 shows a side elevational view of the mold used to form the deck of a boat.

FIG. 3 shows a side elevational view of the mold used to form the hull of a boat that is ultimately joined with the mold shown in FIG. 2.

PREFERRED EMBODIMENT OF THE INVENTION

Figure 1:
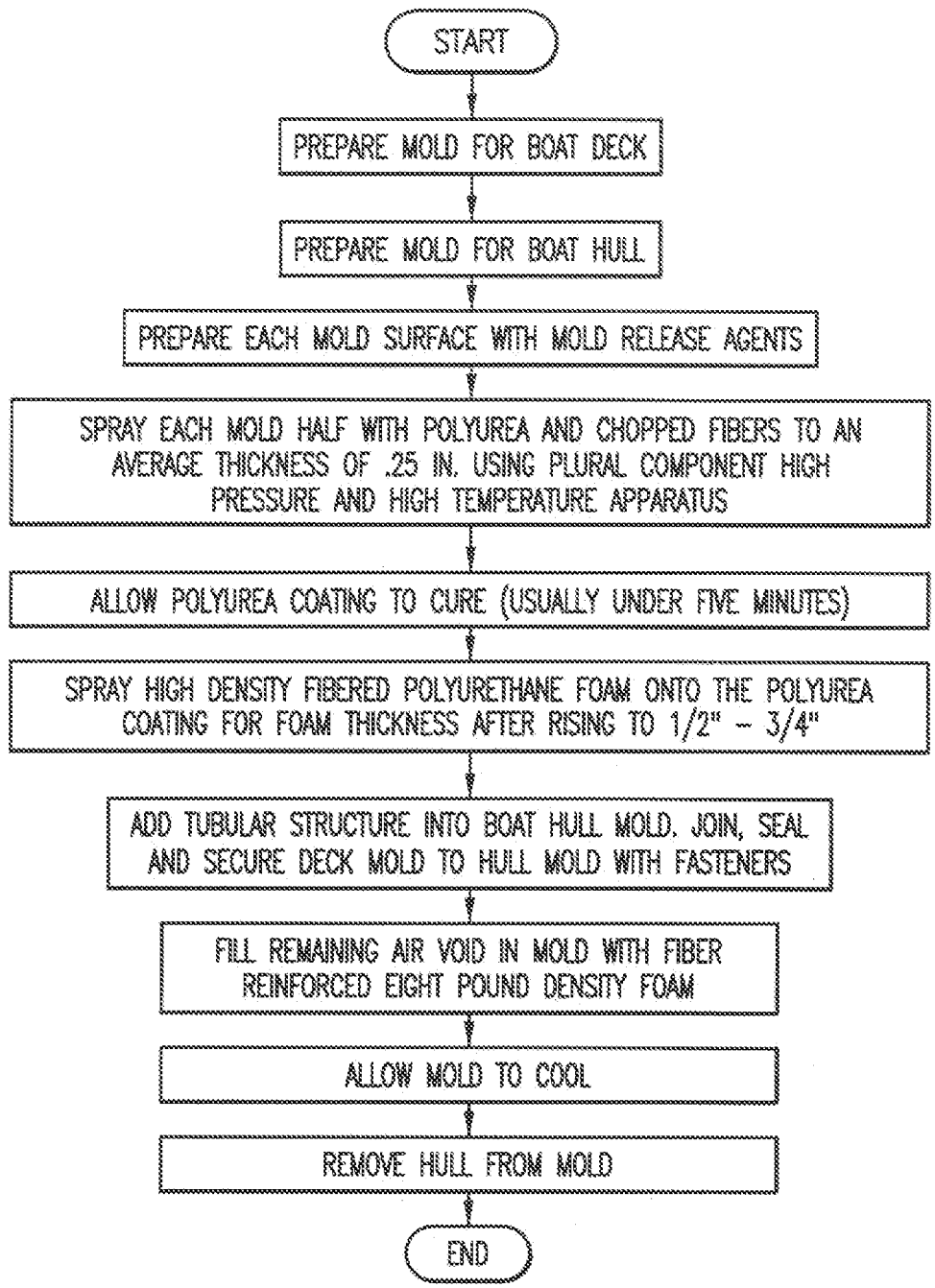
FIG. 1 shows a flowchart for the steps involved in the present invention in the manufacture of a watercraft.

Referring now to the drawings, and in particular FIG. 1, the process used to manufacture a boat is shown. Since the boat will be molded, a pair of molds must be produced, one for the boat deck and one for the boat hull. At a predetermined stage of the process, the boat deck mold is fastened to the boat hull mold as explained below.

The starting point is to have a pair of molds, one for the boat deck and one for the boat hull.

Each mold surface is covered with a mold release agent.

One of the very important steps is that each mold (deck and hull) is first sprayed with a polyurea composition and chopped fibers to an average thickness of 0.250 inches using a plural component high pressure and high temperature spray apparatus and chopper. The plural components in the composition thereof, in order to make polyurea, are described in greater detail below.

The polyurea coating on each mold is allowed to cure, which usually takes less than five minutes.

The next very important step involves spraying high density polyurethane foam onto the polyurea coating that has already been sprayed and cured on each mold, including the deck mold and the boat hull mold. The polyurethane foam thickness after rising should be approximately ½ inch to ¾ of an inch.

The next step is to provide a frame comprised of a metal tubular structure that can be placed into the boat hull mold, at the appropriate location, basically as a peripheral frame around the hull. This frame is molded into the boat hull. Spacers can provide for portions of the metal stainless steel tube to be visible after molding.

The next step is to join, seal, and secure the deck mold, including the coatings that have been applied to the boat hull mold with fasteners. In this condition, the molds described herein are now fastened securely together along the peripheral edges of the mold with fasteners. The molds contain sufficient access ports to allow additional materials to be added to the molds. Thus, in the next step with the molds joined together, the remaining air void inside the joined molds is filled with a fiber reinforced 8 pound density foam until all remaining air voids in the molds are filled.

At this point, the molds that have been fastened together and filled are allowed to cool for approximately a couple of hours.

From a molding perspective the final step is to actually unfasten the molds and remove the finished boat hull and deck which are joined together to form a monolithic structure.

Finally, the seams are trimmed and the hull is prepped and taped for the nonskid and final accessories. The hull is sprayed again with polyurea to provide a textured finish to the decks and molding seam.

An aliphatic polyurea topcoat is applied in desired finished colors. The aliphatic polyurea topcoat adds U.V. stability to provide years of fade resistance.

Note that the entire boat manufacturing process only takes a few hours and is free of volatile organic compounds (VOC).

Referring now to FIG. 2, a schematic diagram that represents the deck mold is shown at 10. The mold deck body 12 is shown such that the surface 12a is the mirror image of the top of the deck surface after the molding process. Thus, the polyurea and chopper fibers that are sprayed onto the deck mold 10 would be sprayed directly on surface 12a in a sufficient thickness 0.250 inches to form the rigid structure that will function as the deck. Once the polyurea deck body has been sprayed and cured, the next step is to spray on fiber reinforced polyurethane foam to desired thickness on top of the polyurea, again, forming the basic structure that will be utilized as a deck along the contour of surface area 12a.

Referring now to FIG. 3, the mold for the boat hull 14 includes the hull outlined surface 14a. Thus, polyurea and chopped fibers are sprayed onto the boat hull mold surface 14a about 0.250 inches thick. Once the polyurea and chopper fibers have cured, a polyurethane foam is sprayed onto the cured polyurea layer to desired thickness.

After the deck mold 12 and the boat hull mold 14 have been joined, the inside air void is filled with a high density fiber material of 8 pound density foam.

Figure 4:
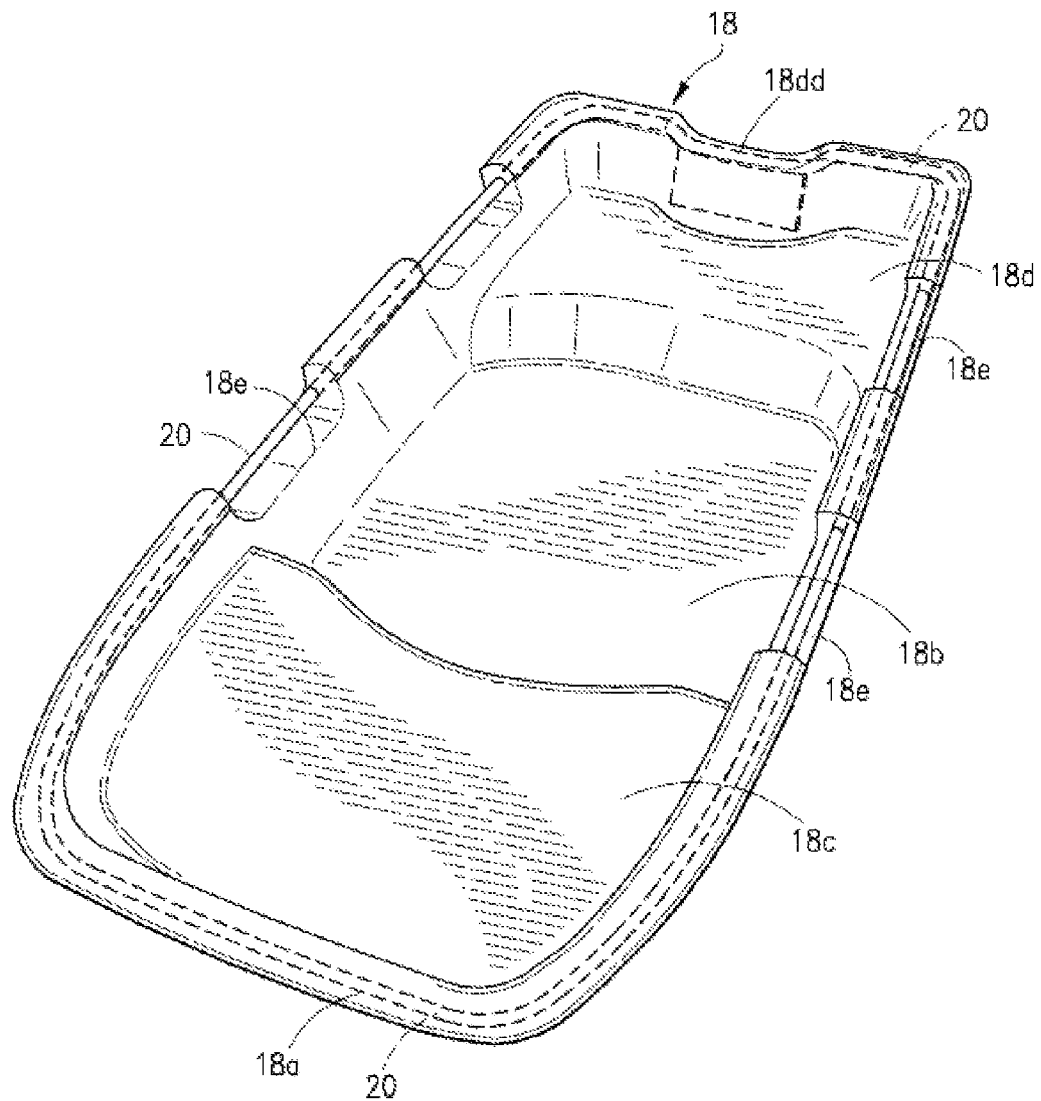
FIG. 4 shows a perspective view of a boat molded in accordance with the invention.

Once the molds 12 and 14 are separated, the boat 18 is shown in FIG. 4 that includes a bow 18a, forward deck 18c, floor 18b, seat 18d, and motor mount recess 18dd. Also shown are exposed handrails 20a formed from frame 20 which has been molded and embedded into the peripheral edge of the boat recesses 18e using mold blanks.

Figure 5:
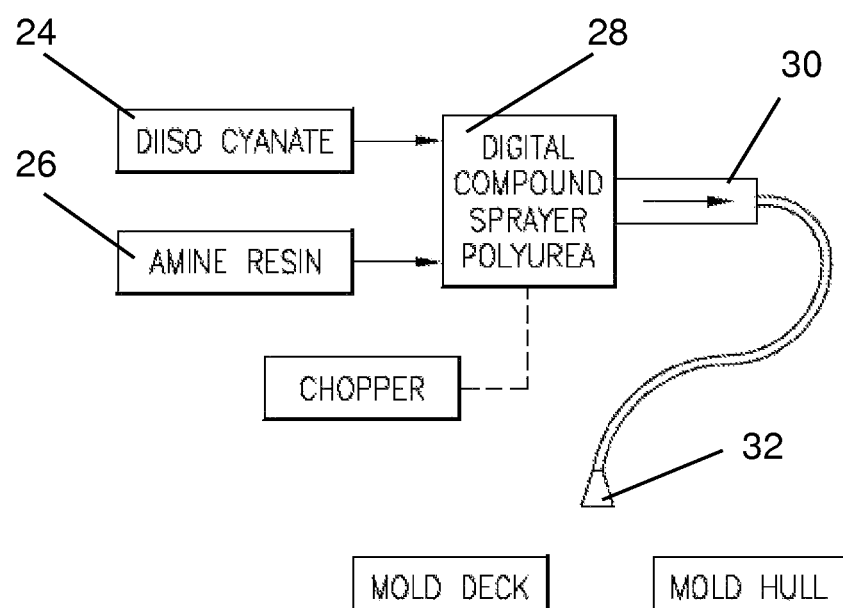
FIG. 5 shows a schematic diagram of a digital component sprayer used with the present invention with respect to the molds.

FIG. 5 shows the digital proportioning plural component sprayer that uses diisocyanate in one container 24 and an amine resin in container 26, both of which are connected to a digital component sprayer container 28 that provides (when mixed) polyurea from conduit 30 out of the nozzle 32. As shown in FIG. 5, polyurea can be sprayed by nozzle 32 onto the deck mold and the boat hull. The chopper shown can provide to the polyurea small chopped pieces of fibers such as glass fiber or Kevlar fibers, or carbon fibers. The addition of the chopped fibers during the coating process which is added to the polyurea mixture greatly enhances the strength of the cured polyurea. In the preferred embodiment, the chopper is used with glass fibers to enhance the strength of the polyurea. The length of each glass fiber that is chopped could be approximately 1 to 2 inches but of any desired length.

Figure 6:
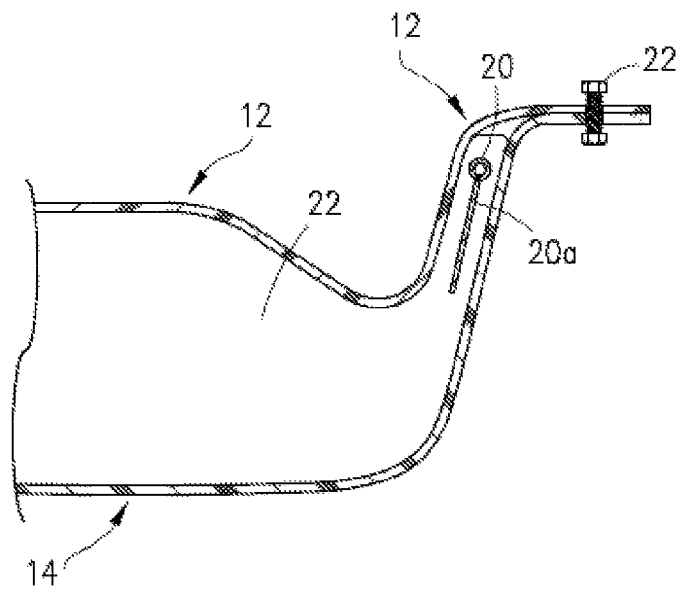
FIG. 6 shows a side elevational view partially cut away of the stern section of the hull mold fastened to the deck mold during the molding process.

Referring now to FIG. 6, the stern or transom segment of the deck mold 12 is shown tightly fastened to the hull mold 14 by fasteners 22. The void between the mold 12 and 14 is filled with fiber reinforced 8 pound density foam which includes mandrel 20 and the motor plate 20a which are also embedded in the fiber reinforced 8 pound density foam. The motor plate 20a and the frame 20 embedded and molded into the structure of the boat increase the structural rigidity of the boat around its periphery and in the stern transom area.

Figure 7:
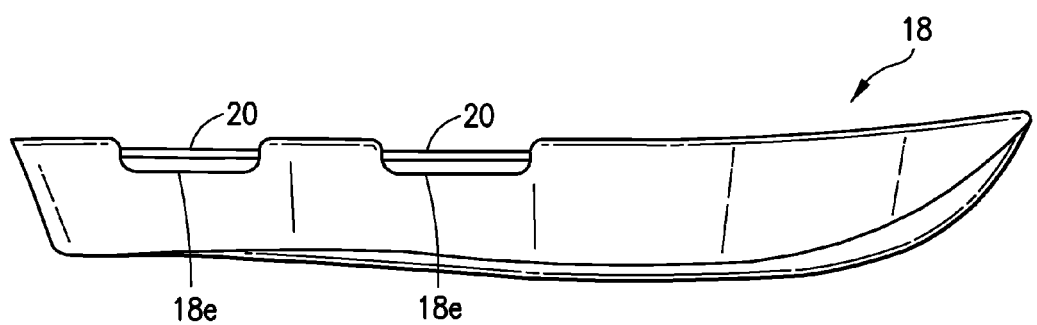
FIG. 7 is a perspective view of the tubular frame before it is placed in the mold.
Figure 9:
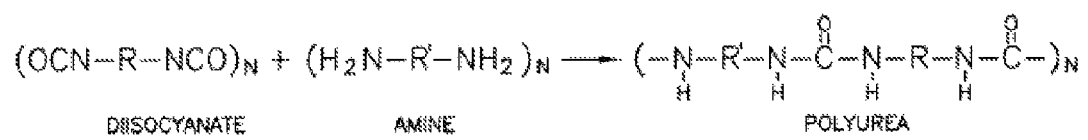
FIG. 9 is the chemical formula of an exemplary polyurea formation reaction useful in the present invention.

FIG. 7 shows a representative boat or the skiff 18 which also shows the spaces 18e which are formed by putting mold blanks along the side rails to expose the frame 20 which forms side rails or handrails.

Figure 8:
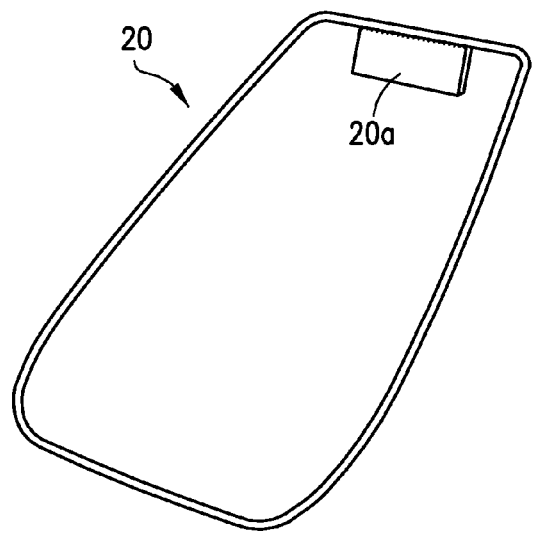
FIG. 8 is a side elevational view of a skiff made in accordance with the present invention.

FIG. 8 shows a perspective view of the mandrel 20 and welded plate 20a which is a motor housing plate prior to the frame 20 being embedded within the molded structure of the boat around the periphery.

Compositions of an embodiment of the present invention comprise a polyurea composition. A polyurea is generated from the reaction of a diisocyanate or polyisocyanate with a compound containing amine groups. A prototypical polyurea formation reaction is shown in FIG. 1. Accordingly, polyurea systems comprise at least two components. The first component comprises an isocyanate and the second component is a component that contains a reactive amine group. As referred to herein, the term polyurea composition refers to a composition containing polyurea-type chemical bonding and excludes polyurethane-type chemical bonding. Thus, the term "polyurea composition" does not include polyurea/polyurethane blends.

The first component may be an aliphatic diisocyanate, such as 1,4-diisocyanatobutane, 1,6-diisocyanatohexane (HDI), 1,12-diisocyanatododecane, 2-methyl-1,5-diisocyanatopentane, or an aliphatic polyisocyanate. The first component may also be a cycloaliphatic diisocyanate such as methylenedicyclohexylene-4,4'-diisocyanate, 3-isocyanatomethyl-3,5,5-trimethylcyclohexyl isocyanate (isophorone diisocyanate, IPDI), 2,2,4-trimethylhexyl diisocyanate, or cyclohexylene-1,4-diisocyanate. The first component may be an aromatic-aliphatic diisocyanate such as m-xylylene diisocyanate or tetramethyl-m-xylylene diisocyanate. The first component may also be an aromatic diisocyanate, such as 2,6-toluene diisocyanate (TDI), 1,3- and 1,4-bis(2-isocyanatoprop-2-yl)benzene (TMXDI), 2,5-toluene diisocyanate, 2,4-toluene diisocyanate, m-phenylene diisocyanate, p-phenylene diisocyanate, methylene bis(o-chlorophenyl diisocyanate), methylenediphenylene 4,4'-diisocyanate, polycarbodiimide-modified methylenediphenylene diisocyanate, (4,4'-diisocyanato-3,3',5,5'-tetraethyl)diphenylmethane, 4,4'-diisocyanato-3,3'-dimethoxybiphenyl(o-dianisidine diisocyanate), 5-chloro-2,4-toluene diisocyanate, or 1-chloromethyl-2,4-diisocyanato benzene. The first component may also comprise mixtures of different isocyanates. One of skill in the art will appreciate that many different di- or poly-isocyanates could be used depending on the particular application.

The second component can be an aliphatic or aromatic amine resin. Suitable polyamines include ethylene diamine, 1,2- and 1,3-diaminopropane, 1,4-diaminobutane, 1,6-diaminohexane, isophorone diamine, isomer mixture of 2,2,4- and 2,4,4-trimethyl hexamethylene diamine, 2-methyl pentamethylene diamine, diethylene triamine, 1,3- and 1,4-xylene diamine, .alpha.,.alpha.,.alpha.',.alpha.'-tetramethyl-1,3- and -1,4-xylylene diamine and 4,4-diaminodicyclohexyl methane. Other compounds to be considered as suitable diamines include hydrazine, hydrazine hydrate and substituted hydrazines, such as N-methyl hydrazine, N,N'-dimethyl hydrazine and homologues thereof, as well as acid dihydrazides, adipic acid, .beta.-methyl adipic acid, sebacic acid, hydracrylic acid and terephthalic acid, semicarbazidoalkylene hydrazides, such as .beta.-semicarbatidopropanoic acid hydrazide, semicarbazidoalkylene carbazine esters, such as 2-semicarbazidoethyl carbazine ester or aminosemicarbazide compounds, such as .beta.-aminoethyl semi-carbazidocarbonate. One of skill in the art will appreciate that many different di- or poly-amines could be used depending on the particular application.

Polyurea systems may also include other components to modify the properties of the end product. By way of example, polyurea systems may also comprise nonreactive additives such as fillers, pigments, stabilizers, plasticizers, organic tackifiers, antioxidants, compatibilizers and the like.

Polyurea systems generally do not use a catalyst to speed up the curing process. The two components cure very rapidly after they are combined, for example, in as few as 5 to 15 seconds. The product resulting from the reaction is generally inert. However, the properties of the resulting polyurea composition will vary as a function of isocyanate-to-amine ratio, polyisocyanate and polyamine architecture, order of reactant addition, mixing speed, temperature, applicator throughput, applicator configuration and size, residence time, residence time distribution, and whether any fillers, additives, or property modifiers are added to the composition. One of skill in the art will appreciate that the properties of the resulting polyurea composition can be modified as desired through changes to these variables.

Polyurea coating systems are available commercially from a variety of sources. One such system is TURBOLINER® 117502, available from Turboliner Inc., 1 West Cameron Avenue, Kellogg, Id. 83837.

In addition to the polyurea spray described herein, in the preferred embodiment, Applicant includes chopped fibers such as glass fibers, Kevlar fibers, or carbon fibers which are mixed and added at the time the polyurea is being mixed and sprayed onto the mold surfaces. By adding chopped fibers such as glass fibers of a predetermined chopped length to the mixture, the resultant polyurea structure strength is greatly enhanced.

With the present invention, the problems of building a fiberglass boat which is extremely time-consuming, resulting in high construction costs and which disperses toxic chemicals into the environment, are eliminated.

Using the invention described herein, watercraft of all sizes and functions can be manufactured efficiently and safely for the environment.

As an example of the polyurea used in this invention, U.S. Pat. No. 7,125,032, issued Oct. 24, 2006, describes a polyurea coating and its application which can be used as the polyurea described herein. Applicants incorporate by reference the subject matter described in U.S. Pat. No. 7,125,032.

An important aspect of this invention is the ability to use structural metal tubes for rigid construction using stainless steel or other tubular materials for the frame peripheral support structure throughout the watercraft including handrails that are exposed. These tubes are used as support structures for increased rigidity in certain areas of the watercraft.

While the present invention has been described with reference to particular implementations, those skilled in the art will recognize that many changes may be made hereto without departing from the spirit and scope of the present invention.

What we claim is:

1. A boat, comprising:
a molded hull body comprising an outer polyurea first boat hull support layer and a polyurethane foam second layer, forming a boat hull moldably affixed to said polyurea first boat hull support layer;
a molded deck body comprising an outer polyurea first support layer and a polyurethane foam second support layer moldably affixed to said polyurea first layer forming a boat deck sized to fit on said molded boat hull;
said hull body and said deck body joined together to form said boat;
a polyurethane foam seam joining and between said joined hull body and said deck body filled with a polyurethane foam; and
a polyurea coating covering said polyurethane foam seam.

2. A method of manufacturing a boat, comprising:
providing a mold of a boat deck and a mold of a boat hull, said deck and said hull configured to be joined together to form a boat;
applying a polyurea first support layer onto each of said molds;

allowing said polyurea first support layer of each of said molds to cure;
applying a polyurethane foam second layer onto said polyurea first support layer for each of said molds;
joining said hull and deck molds together with one or more fasteners creating a hull deck engagement area in said joined molds;
filling the volume in said joined hull and deck molds between said molds with fiber reinforced foam;
releasing said molds from each respective said polyurea layer; and
spraying the exterior hull deck engagement reinforced foam area with polyurea.

3. The method of claim 2, wherein said polyurea layers comprise a diioscyanate and amine resin.

* * * * *